H. J. BUBENHEIM.
CAR TRUCK.
APPLICATION FILED NOV. 13, 1915.

1,314,183.

Patented Aug. 26, 1919.
3 SHEETS—SHEET 1.

WITNESS:

INVENTOR.
Henry J. Bubenheim,
By H. W. Stevenson
ATTORNEY.

H. J. BUBENHEIM.
CAR TRUCK.
APPLICATION FILED NOV. 13, 1915.
1,314,183.
Patented Aug. 26, 1919.
3 SHEETS—SHEET 2.
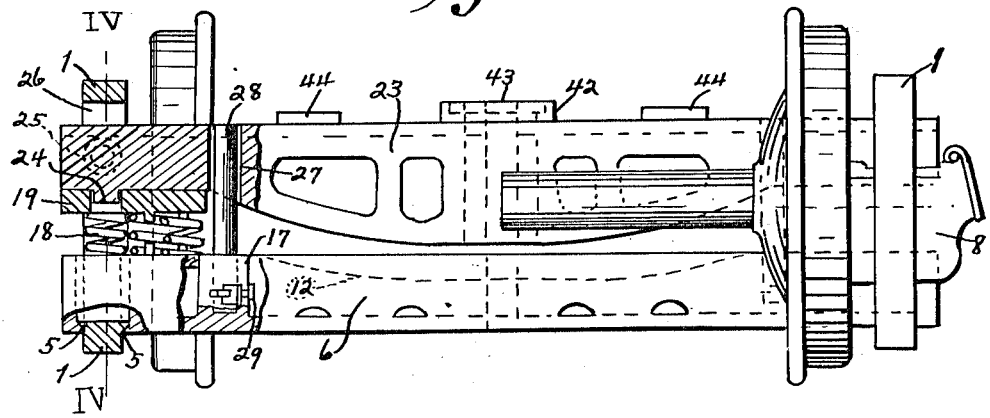
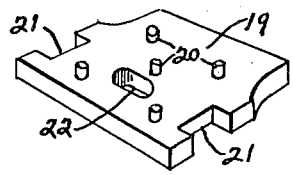
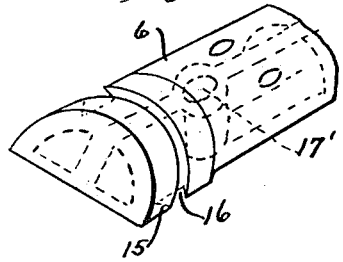
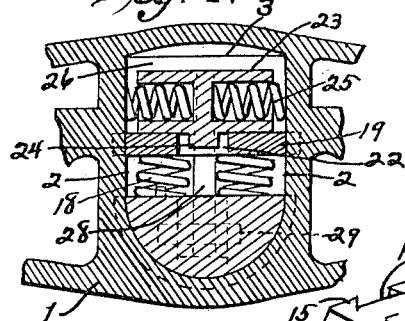
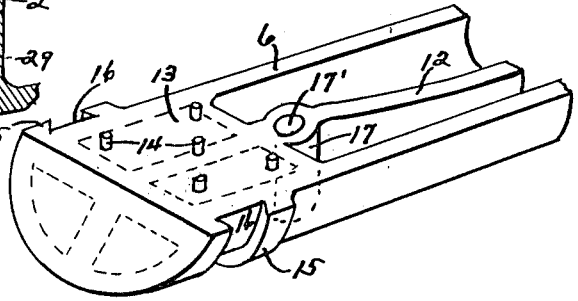
WITNESS:
INVENTOR.
Henry J. Bubenheim,
By H. U. Stevenson
ATTORNEY

H. J. BUBENHEIM.
CAR TRUCK.
APPLICATION FILED NOV. 13, 1915.

1,314,183.

Patented Aug. 26, 1919.
3 SHEETS—SHEET 3.

WITNESS.

INVENTOR
Henry J. Bubenheim,
By H. W. Stevenson
Attorney

UNITED STATES PATENT OFFICE.

HENRY J. BUBENHEIM, OF PITTSBURGH, PENNSYLVANIA.

CAR-TRUCK.

1,314,183.  Specification of Letters Patent.  Patented Aug. 26, 1919.

Application filed November 13, 1915. Serial No. 61,219.

*To all whom it may concern:*

Be it known that I, HENRY J. BUBENHEIM, a citizen of the United States, residing at Pittsburgh, in the county of Allegheny and State of Pennsylvania, have invented a certain new and useful Improvement in Car-Trucks, of which the following is a specification.

My invention is designed primarily with the object in view of providing a car truck that is held together and assembled without the necessity for using bolts, nuts, or rivets. In other words I have discovered and perfected an efficient and practical boltless-rivetless car truck, that can be easily and quickly put together and disassembled, involving comparatively few units or co-acting parts.

Another function incorporated in my novel construction of car truck is the means employed for taking care of the strains and torsions imparted to the truck when running along a section of uneven track, or else rounding a curve, the several coacting elements, which are flexibly connected and associated, readily responding and adjusting themselves to any irregularity or curvature in the track, said elements being so constituted and arranged as to be automatically and positively self centering under all conditions.

The simplicity, and at the same time practicability, of my improved construction of car truck, will insure its production and assemblage at a minimum cost for material and labor. In addition this truck will, by readily accommodating itself to uneven trackage and curves, practically eliminate excessive and damaging torsional conditions, throughout all sections of the truck.

Figure 1:
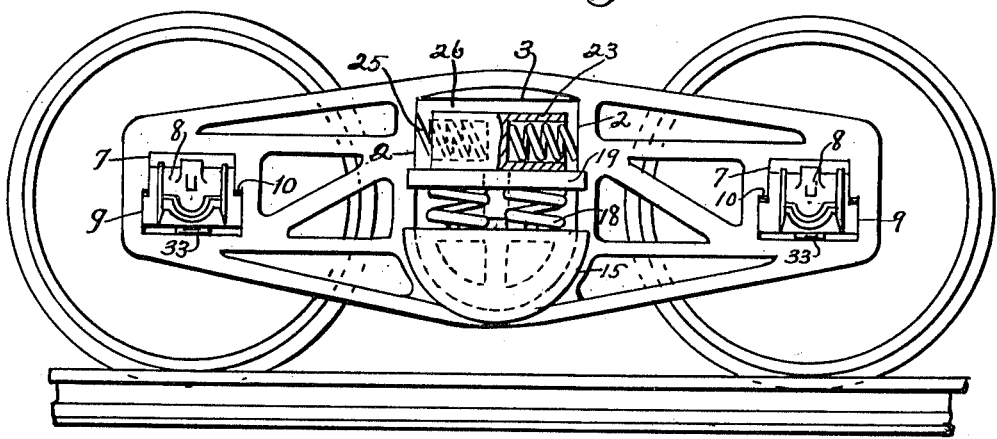
Figure 2:
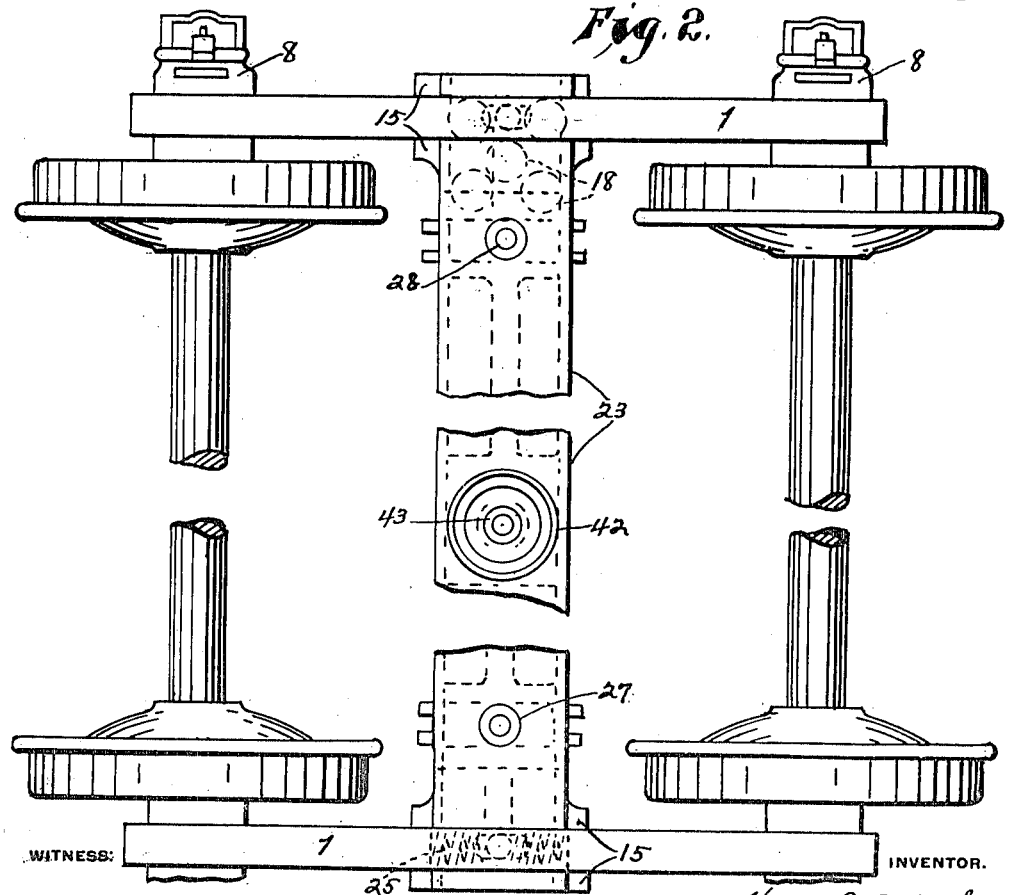
Figure 8:
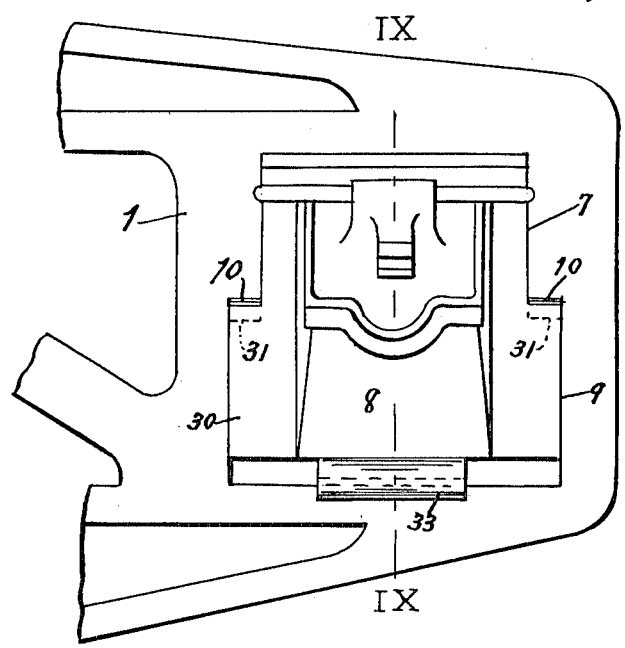
Figure 9:
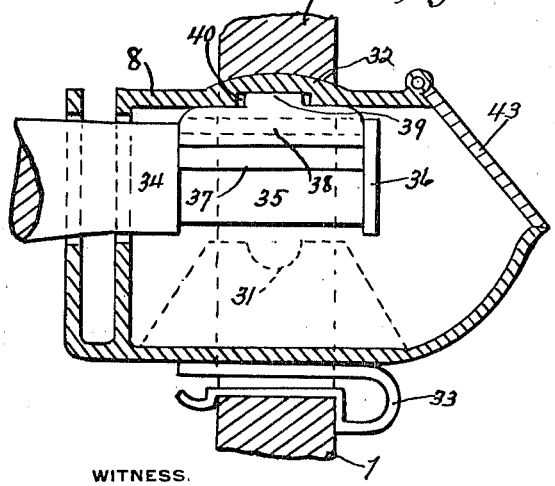
Figure 10:
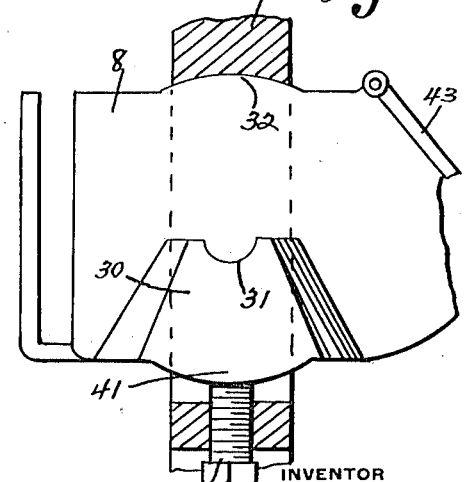

With the foregoing objects in view my invention consists in the approximate embodiment and arrangement of coacting units, as illustrated in the accompanying drawing, forming a part of this specification, in which Figure 1 is a side elevation of one side of the truck; Fig. 2 is a plan view of the truck in broken formation; Fig. 3 shows an end elevation, partly in section; Fig. 4 is a transverse section taken on the line IV—IV of Fig. 3; Fig. 5 is a perspective view of the bottom side of one of the spring bearing plates; Fig. 6 shows in perspective, and in reverse attitude, one end of the dovetail grooved bottom bolster; Fig. 7 is a similar view of said bottom bolster in its upright functional position; Fig. 8 is an end elevation of one of the side frames housing a journal box; Fig. 9 is a vertical section taken on the line IX—IX of Fig. 8, and Fig. 10 is a side elevation of a modified construction of journal box, the housing frame being in section.

The two side frames of the truck, which are exact duplicates of each other, and having their greatest depth at the longitudinal center thereof, gradually tapering toward each end, are each indicated as a whole by the numeral 1, at the center of each frame there being provided a suitable sized opening, or unobstructed space, having the parallel side walls 2—2, the horizontal top portion 3, and bottom section 4, which latter part is made semi-circular in configuration, the entire half circle being constructed with a dovetail flange 5 at both sides of the frame, which construction constitutes a curved bearing for the journaled end of the bottom bolster 6.

The two end sections of each side frame are also provided with apertures or housing spaces 7 for the reception of the journal boxes 8, said apertures having a widened out lower section 9, that forms the overhanging shoulders 10, these latter portions being rounded off, or of a convex configuration, in order to provide pivotal bearings for the journal box; a detail description of which will be made hereinafter.

The bottom bolster, indicated as a whole by the numeral 6, is semi-circular in cross-section throughout its entire length, is preferably made in one piece, cored out for the purpose of lightness, and provided with a centrally disposed longitudinal rib portion 12. Each end section of this bolster has an upper disposed flat bearing surface or integral plate 13, which carries a plurality of upwardly projecting lugs 14, the ends of this bolster terminating in a peripheral rib, or semi-circular enlarged cross section 15, in which is a dovetail groove 16 of adequate size to receive the dovetail flange 5 formed on the side frame.

The central rib 12, adjacent to the inner edge of said plate 13, at both ends of the bolster, is provided with an enlarged portion or boss 17, having a centrally disposed vertical aperture 17' therein, which aperture terminates inside the bottom portion but does not necessarily extend clear through the bolster. The bottom portion of said bolster may be apertured, as shown, in order to provide for an escapement of dirt that will naturally accumulate in the cavities thereof.

This foregoing described bolster bridges the space between, and serves to unite, the two side frames, which members act in the capacity of a truss or support for the end sections of this bolster, the assembling of these three units requiring that the ends of said bolster first be guided into the central opening in the side frames, then tipped or angled in order that the flat or upper face of the bolster will incline in approximate vertical alinement with the walls 2, in which position it will be an easy matter to register the dovetail flange 5 in the receptive dovetail groove 16, after which said bolster is further guided downward along the semicircular flange 5 until the full arc of both the dovetail flange and groove are in full registering engagement one with the other. When thus interlocked said bolster will assume its normal functional attitude, as shown in Fig. 4, with the upper flat face lying in an approximate horizontal plane.

The dovetail interlocking feature thus provided between the coacting bottom bolster and two side frames, insures absolute union of these three main units, and prevents any separation thereof, no longitudinal movement or displacement of the said bolster being possible.

The next step in the assembling process involves the placing of a suitable number of resilient members, preferably coil springs 18, resting on the flat surface 13 and over the confining lugs 14, this being carried out at both ends of the bolster inside the central housing space.

On top of these resilient members is next placed the spring plate or bearing member 19, shown in Fig. 5, the spaced-apart lugs 20 formed on the under disposed face of this element serving, in conjunction with the aforesaid lugs 14 carried by the bottom bolster, to prevent any shifting or displacement of the spring members 18. This said plate 19 is further provided with two alining side notches or cut-out portions 21, which receive and straddle the vertical side walls 2, thereby preventing any displacement of said plate, other than up and down, it being free to move only in a vertical path. This plate is further provided with an elliptical slot 22, approximately midway between and in alinement with the notches 21, which slot preferably passes entirely through the plate.

The top bolster, designated as a whole by the numeral 23, is likewise preferably made in one piece, and is positioned in parallel horizontal alinement directly above, and in spaced-apart relationship with, the said bottom bolster, as shown in Fig. 3. This member 23 preferably has its greatest depth or vertical section at the longitudinal center thereof, and gradually tapers, with a corresponding reduced vertical section, toward the end portions, said taper terminating a predetermined distance short of the extreme ends.

The ends of this top bolster each have a flat under side or bearing surface which engages with the upper surface of the plate 19, both ends carrying an under disposed and depending lug 24, that is designed to enter and seat in the elliptical slot 22 formed through the said plate, thereby securing said top bolster against longitudinal movement. The width of these end sections is somewhat less than the full width of the housing opening, as seen in Fig. 4, in order that this top bolster may be accorded a slight lateral play or adjustment, this movement being permitted by reason of the elliptical slot 22, taken in conjunction with the variable widths of the said end sections and housing space. Both end sections of the top bolster are recessed along their side portions to a predetermined depth, in order to provide seats for the oppositely disposed coil spring members 25, which members project outwardly beyond the mouth of said receptive recesses, and bear against the side walls 2.

This construction affords a resilient or cushioning function for the top bolster during any lateral movement of this member, a limited amount of vertical play likewise being accorded said top bolster by reason of the clearance or space 26 left above the end sections. Both end sections are further provided with vertically disposed apertures 27, said holes passing entirely through the structure in order to receive the securing and connecting bars 28, they being of sufficient length to enter and seat in the aperture 17' formed in the bottom bolster. An aperture provided at the lower extremity of these bars, which register with another aperture formed through the walls of the boss 17, permits of the insertion of a key or pin 29, that serves to rigidly anchor said bars in their vertical functional attitude. The aperture 27 is made slightly larger in diameter than the diameter of said inserted bar member, in order that there will be no binding at this point, allowing the top bolster free movement vertically, with a limited amount of lateral play.

The journal boxes 8, four in number, are each one provided at their lower portions, exterior of the vertical side walls, with an integral enlargement or projection 30, the full cross section at this point occupying approximately the entire width of the enlarged space 9, said box, by reason of the engagement of said projecting portions with the vertical side walls of said housing space 9, being thus held and confined against any lateral movement. The upper, or narrowest ledge of these projecting portions, has formed therein a semi-circular groove or concavity 31, designed to receive and provide a seat for the rounded off or convex shoulder portions 10, thus furnishing a pivotal union between the journal box and surrounding frame.

On the top of each journal box, and extending the full width thereof, is a raised portion 32 of a convex configuration, the arc of which is drawn from a point at the axial center of the concavity 31, this said part having its bearing against an under disposed concave surface formed in the frame or upper edge of the aperture 7, whereby the box will have a self centering and tilting slide function when being moved from its two alining pivotal centers. Intermediate of the bottom surface of the journal box and frame is positioned a leaf spring, or equivalent cushioning member 33, which preferably straddles said frame in order to prevent any displacement or shifting thereof, and serves as a resilient bearing for the box.

No particular novelty is claimed for the inserted and housed axle 34, having the reduced neck or journal portion 35, extreme end collar 36, and contact bearing block or brass 37. I do however claim an added improvement in the saddle member 38, which seats over the brass element 37, said saddle having the centrally disposed and integral circular boss portion 39, which seats in a receptive recess or slot 40 having an elliptical configuration, formed centrally of the inner roof of the box, this aforesaid construction constituting and insuring a pivotal union or swivel connection between the journal and box, whereby said journal is free to swing or adjust itself in a limited arc, independent of the tilting function accorded the box member.

When thus constructed, arranged, and combined, approximately as shown and described, there is provided a positive universal joint union between the side frame, journal, and box, whereby these three members are free for independent adjustment, at variable angles away from their normal positions, thereby avoiding any torsional conditions at the four corner portions of the truck.

In Fig. 10 is shown a slightly modified form of journal box, whereon there is provided, exterior of the bottom surface, a centrally disposed convex section or welt 41, the arc of which is identical with its coacting convex part 32 formed on the top portion, and in vertical alinement therewith, a set screw or similar equivalent member 42 being substituted for the spring element 33, said screw entering through the frame structure, and its inner end bearing against the said welt 41. Each journal box carries the usual hinged drop door or lid 43.

When thus assembled as shown, with all the heretofore described units in their proper coacting relationship one with the other, the car body, not shown, will be supported by the two horizontally alining top bolsters, one for each truck, the usual center plate 44, with its associated king-pin element 45, together with the usual spaced-apart, upwardly projecting circular boss members 46, for turning engagement with the bottom side of the car body, being carried by the top bolsters.

The entire weight of the car body, including the top bolsters and bearing plates 19, will be carried and equally distributed by means of the plurality of resilient elements 18, positioned intermediate of said plates and bottom bolsters. The top bolsters are free to respond to variable weights or loads imposed thereon, their upward movement being limited by the top bar 3 of the frame structure and their downward path by the full depression limit of the spring elements 18. Said top bolsters have a limited amount of lateral play in either direction and are automatically self-centering by reason of the resilient members 25, no longitudinal movement of these bolsters being possible owing to the depending lugs 24, which enter the transversely arranged elliptical slot 22 provided in the bearing plate 19.

In the event of there being any unevenness or dip in the rails, whereby the car wheels in passing over such depression would set up variable degrees of torsion throughout the truck body, the flexible nature of my novel construction, due to the peculiar formation and arrangement of the coacting units, would cause said parts to instantaneously and automatically rearrange themselves so as to compensate for the strains thus imparted to the truck, whereby such torsional condition would be absolutely taken care of and absorbed without serious detriment or distortion of the coacting parts, all of said parts automatically returning to their normal attitudes, and relationship with all the other parts, the instant said torsional condition has ceased.

For example: Presuming that any one of the four wheels or corners of the truck reaches a depression or dip in the rail, thereby causing said wheel to drop below the horizontal level of its associated wheels, be the difference in elevation ever so slight, thus allowing the load to depress that end of the side frame accordingly, this member, owing to its journaled or pivoted union with the semicircular bottom bolster, will then be free to tilt at any angle above or below its normal horizontal attitude. At the commencement of this depressel movement of said side frame, the journal box 8, by reason of its pivotally mounted association with the side frame, will readily respond to this condition and tilt, or readjust itself away from its normal horizontal attitude, in unison with the angular position assumed by the axle and side frame, the opposite or naturally uplifted end of the frame easily shifting along with the journal box by means of the pivotal union with the journal 35, at which juncture the saddle member 38 will shift on its bearing accordingly, assuming a more or less angular attitude in unison with the tilted box and frame, no binding or friction being possible under this condition.

The instant either end of the side frame is depressed, due to the cause heretofore enumerated, thereby elevating the opposite end, the vertical wall 2, at the raised side of the frame from its pivotal center, will act to collapse the spring element 25 carried by the top bolster at that side of contact, the bearing plate 19 likewise tilting or assuming an angular attitude in unison with the side frame. Should the depression of the wheel, and corresponding tilting of the side frame, be sufficient to cause a complete collapse of the spring element 25 inside its receptive recess, and the tilting movement continuing beyond this point, the vertical wall 2 finally coming into engagement with the side of the top bolster, will exert a shoving movement of said member laterally over its contacting plate member 19, thereby depressing the spring element 25 positioned in the frame housing at the opposite side of the truck.

When the depressed wheel finally regains its normal level with the other three wheels, and the torsional condition is thereby eliminated, all of the coacting parts will instantaneously and automatically return to their normal positions by a reverse action from that just described.

This ready adjustment of the parts, and quick response to torsional conditions, will be carried out in the manner above explained, under all variable conditions of trackage that are liable to arise, and this claim holds good no matter whether one, two, or three of the wheels simultaneously or alternately, are depressed below or raised above the normal level of their associated wheel or wheels, during the passage of the truck along the rails.

The two parallel and alining top and bottom bolsters are intended to retain their normal vertical attitudes, and practically the only condition that might arise, which would cause said two bolsters to assume an angular position, other than truly vertical, would be the breaking or undue sagging, due to various causes, of one or more of the spring members 18, in which event the chief functional necessity for the vertically disposed bars 28 comes into play.

These said bars 28, which have their lowermost extremities anchored to the bottom bolster, their upper section projecting through the top bolster, serve to unite both bolsters, and should any one or more of the springs 18 at either side become broken or unduly collapsed, the excess weight and strain imposed on the remaining springs would have a tendency to cause the bottom bolster to roll or shift in its two end bearings until it has taken up the excess play allowed in the aperture 27 formed in the top bolster, when the said connecting bars 28 will, upon a further rocking motion of the bottom bolster, act in the capacity of levers to shift the top bolster laterally, the top springs 25 being called upon to cushion this thrust.

What I claim as my invention is:

1. In a car truck, a side frame provided with a centrally disposed and unobstructed space having parallel vertical sides and a semi-circular bottom portion of an approximate dovetail formation in cross section, both end sections of the frame being apertured to house journal boxes.

2. In a car truck, a side frame provided with a centrally disposed and unobstructed space having parallel vertical sides and semi-circular bottom portions, both ends of the frame being apertured to house journal boxes, said latter apertures having a widened out lower section forming overhanging and alining shoulders.

3. In a car truck, a side frame provided with a centrally disposed and unobstructed space having parallel vertical sides and a semi-circular bottom portion, the latter part being of a dovetail formation, both end sections of the frame being apertured in order to house journal boxes, said latter apertures having a widened out lower section forming overhanging and alining shoulders which are convex in cross section.

4. In a car truck, the combination with the apertured side frame, of a journal box having exteriorly arranged semi-circular and alining side bearing portions, together with a transversely arranged convex raised section central of the top portion, the box housing apertures, formed in the end sections of the frame, having suitable bearings whereby the journal box will have a pivotal function within the frame.

5. In a car truck, the combination with the side frame having apertured end sections, which apertures are provided with alining and rounded off shoulders, of a journal box adjustable within the aperture, said box having exteriorly arranged semi-circular and alining side bearing portions for engagement with the said shoulders, together with a transverse convex raised section central of the top portion, which convex part seats in a concavity formed in the frame, whereby a pivotal union is provided between the frame and box.

6. In a car truck, the combination with the side frame and axle, of a journal box having exteriorly arranged semi-circular and alining side bearing portions, together with an exteriorly arranged and transverse raised section central of the top portion, said box being further provided with a recess central of the inner surface of the top portion, an aperture formed in the end of the frame for housing the journal box, said aperture having pivotal bearings for the box, and a saddle, having a circular boss portion, mounted over the journal and swiveled in the inner recess of the box, whereby a universal joint union is provided between the frame, box, and journal.

7. A car truck having alining side frames, each one provided with a housing space at its longitudinal center, said space having a semi-circular bottom seat of a dovetail formation, and a bolster uniting the side frames, said bolster having a semi-circular cross section at its end portions, which ends are provided with a semi-circular dovetail groove for registering engagement with the dovetail seat, whereby an interlocking feature is provided between the frames and bolster.

8. A car truck having alining side frames, each frame being provided with a housing space at its longitudinal center, said space having a semi-circular bottom seat of a dovetail formation, a bolster uniting the side frames, said bolster having a semi-circular cross section at both ends, which ends are provided with a semi-circular dovetail groove for registering engagement with the dovetail seat, whereby an interlocking and pivotal union is provided between the frames and bolster, and a second bolster arranged in parallel longitudinal alinement above the first mentioned bolster, said second bolster having a limited amount of lateral and vertical play, but held against any longitudinal movement.

9. A car truck having alining side frames, each frame being provided with a housing space at its longitudinal center, said space having a semi-circular bottom seat of a dovetail formation, a bottom bolster uniting the side frames, said bolster having a semi-circular cross section at both ends, which ends are provided with a semi-circular groove of a dovetail formation for registering engagement with the dovetail seat, a second bolster arranged in parallel longitudinal alinement above the bottom bolster, its end sections seating in the central housing space, said second bolster being held against longitudinal movement, but being adjustable both vertically and laterally, and resilient means intermediate of the top and bottom bolsters.

10. A car truck having alining side frames, each frame being provided with a housing space at its longitudinal center, said space having a semi-circular bottom seat of a dovetail formation, together with vertical side walls, an under disposed bolster uniting the side frames, said bolster having a semi-circular cross section at both ends, which ends are provided with a semi-circular dovetail groove for registering engagement with the dovetail seat, a second bolster arranged in parallel longitudinal alinement above the first mentioned bolster, its end sections seating in the central housing space, which ends carry resilient elements designed to contact with the vertical sides of the central housing space to cushion the side thrust of the top bolster, resilient means intermediate of the two bolsters, and means for preventing longitudinal movement of said top bolster.

11. A car truck having alining side frames, each frame being provided with a housing space at its longitudinal center, said space having a semi-circular bottom seat of a dovetail formation, an under disposed bolster uniting the side frames, said bolster having a semi-circular cross section at both ends, which ends are provided with a semi-circular dovetail groove for registering engagement with the dovetail seat, resilient members supported by the said bolster within the central housing space, a plate seated on the said resilient members, a second bolster arranged in parallel longitudinal alinement above the first mentioned bolster, its end sections seating in the central housing space and contacting with the said plate, resilient members carried by the top bolster designed to contact with the sides of the central housing space to cushion the side thrust of said top bolster, and means carried by said top bolster, coöperating with means formed in the said plate, for preventing longitudinal movement of the top bolster.

12. A car truck having alining side frames, each frame being provided with a housing space at its longitudinal center, said space having a semi-circular bottom seat of a dovetail formation, together with vertical side walls, an under disposed bolster uniting the side frames, said bolster having a semi-circular cross section at both ends, which ends are provided with a semi-circular dovetail groove for registering engagement with the dovetail seat, resilient members supported by the said bolster within the central housing space, a plate member seated on the said resilient members, said plate being adjustable only in a vertical path and provided with an elliptical slot, a second bolster arranged in parallel longitudinal alinement above the first mentioned bolster, its end sections seating in the central housing space and contacting with the said plate, means carried by the end sections of the top bolster for registering engagement in the elliptical slot formed in said plate, for preventing longitudinal movement of the top bolster, resilient means carried by the top bolster designed for engagement with the sides of the central housing opening to cushion the side thrust of said top bolster, and means anchored in the bottom bolster and projecting through the top bolster for uniting both bolsters.

13. A car truck having alining side frames, each frame being provided with a housing space at its longitudinal center, said space having a semi-circular bottom seat of a dovetail formation, together with vertical side walls, journal boxes mounted for pivotal adjustment within the end sections of the frames, an under disposed bolster uniting the side frames, the end sections of said bolster being provided with a semi-circular dovetail groove for registering engagement with the dovetail seat, resilient members supported by the said bolster within the central housing space, a plate member seated on the said resilient members, said plate being adjustable only in a vertical path and provided with a transversely arranged elliptical slot, a second bolster arranged in parallel longitudinal alinement above the first mentioned bolster, its end sections seating in the central housing space and contacting with the said plate, means carried by the top bolster and registering in the slot formed in said plate for preventing longitudinal movement of the top bolster, resilient members arranged in the end sections of the top bolster for cushioning the side thrust of this member, and means anchored in the bottom bolster and entering through the top bolster for uniting both bolsters.

14. A car truck having alining side frames, each frame being provided with a housing space at its longitudinal center, said space having a semi-circular bottom seat of a dovetail formation, an under disposed bolster uniting the side frames, the ends of this bolster being provided with a semi-circular dovetail groove for registering engagement with the dovetail seat whereby an interlocking and pivotal union is provided between the side frames and bolster, resilient members seated on this said bolster, a plate member seated on the said resilient members, a second bolster arranged in parallel alinement with the first mentioned bolster its end sections resting on the said plate member, and means anchored in the bottom bolster and entering through the top bolster for uniting both bolsters.

15. A car truck having alining side frames, each frame being provided with a housing space at its longitudinal center, said space having a semi-circular bottom seat of a dovetail formation, an under disposed bolster uniting the side frames, the ends of this bolster being provided with a semi-circular dovetail groove for registering engagement with the dovetail seat whereby an interlocking and pivotal union is provided between the side frames and bolster, a second bolster arranged in parallel alinement with the first mentioned bolster its end sections seating in the central housing space, resilient means intermediate of the said two bolsters, and means for connecting both bolsters for simultaneous pivotal adjustment.

16. A car truck involving side frames, each frame having a housing space at its longitudinal center and also in each end portion, a bolster uniting said side frames, its ends being housed in the central space and in interlocked and dovetailed pivotal union with the side frames, and journal boxes pivotally mounted in the end spaces of each frame.

17. A car truck involving side frames, which frames are apertured at their longitudinal centers and also at both ends, the central aperture having a semi-circular seat of a dovetail formation, a bolster connecting the side frames, its end sections being provided with a semi-circular dovetail slot adapted for registering engagement with the said dovetail seat, whereby an interlocking and pivotal union is established between the frames and bolster, said end apertures housing pivotally mounted journal boxes.

18. In a car truck a bolster having its end sections semi-circular in cross section, said ends being provided with a dovetail groove.

19. In a car truck the combination with the side frames, each frame having a semi-circular dovetail seat, of a bolster designed to connect the said frames, which bolster is provided with a semi-circular dovetail groove in each end for registering engagement with the dovetail seat, whereby a removable interlocking and pivotal union is established between the said frames and bolster.

20. A car truck having side frames, a lower disposed bolster uniting the side frames, its end sections being in interlocked and pivotal union with said frames, a second bolster arranged in parallel longitudinal alinement above the first mentioned bolster, and means uniting both bolsters for simultaneous pivotal adjustment.

21. A car truck having side frames, a lower disposed bolster connecting the side frames, its end sections being in interlocked and pivotal union with said frames, a second bolster arranged in parallel alinement above the first mentioned bolster, resilient members intermediate of said bolsters, and means uniting both bolsters for simultaneous adjustment.

In testimony whereof I affix my signature this 23d day of October, 1915.

HENRY J. BUBENHEIM.